United States Patent [19]

DiBella et al.

[11] Patent Number: 4,733,536
[45] Date of Patent: Mar. 29, 1988

[54] INTEGRATED MECHANICAL VAPOR RECOMPRESSION APPARATUS AND PROCESS FOR THE COGENERATION OF ELECTRIC AND WATER-BASED POWER HAVING A RECIRCULATION CONTROL SYSTEM FOR PART-LOAD CAPACITY

[75] Inventors: Francis A. DiBella, Roslindale; Frederick E. Becker, Reading; John C. Balsavich, Jr., Foxboro, all of Mass.

[73] Assignee: Gas Research Institute, Chicago, Ill.

[21] Appl. No.: 97,251

[22] Filed: Sep. 17, 1987

Related U.S. Application Data

[63] Continuation of Ser. No. 921,966, Oct. 22, 1986, abandoned.

[51] Int. Cl.$^4$ .............................................. F01K 23/10
[52] U.S. Cl. ........................................ 60/618; 417/309
[58] Field of Search ................ 60/618, 670, 676, 645, 60/39.18 B; 417/309

[56] References Cited

U.S. PATENT DOCUMENTS

| | | | |
|---|---|---|---|
| 1,659,963 | 2/1928 | Schmidt | 60/618 |
| 2,122,280 | 6/1938 | Diedrich . | |
| 2,358,815 | 9/1944 | Lysholm . | |
| 2,619,796 | 12/1952 | Sterland | 60/39.15 |
| 3,228,189 | 1/1966 | Baker . | |
| 3,267,671 | 8/1966 | Hill | 60/39.43 |
| 3,310,043 | 3/1967 | Gamage . | |
| 3,350,876 | 11/1967 | Johnson . | |
| 3,830,062 | 10/1973 | Morgan | 60/618 |
| 3,879,937 | 4/1975 | Jenny | 60/39.45 |
| 3,962,873 | 6/1976 | Davis . | |
| 3,979,913 | 9/1976 | Yates | 60/618 |
| 4,087,974 | 5/1978 | Vaughan | 60/618 |
| 4,099,489 | 7/1978 | Bradley | 123/3 |
| 4,201,058 | 5/1980 | Vaughan . | |
| 4,222,231 | 9/1980 | Linn | 60/39.45 |
| 4,235,077 | 11/1980 | Bryant | 60/618 |
| 4,300,353 | 11/1981 | Ridgway | 60/618 |
| 4,366,674 | 1/1983 | Eakman | 60/618 |

FOREIGN PATENT DOCUMENTS 310184 12/1919 Fed. Rep. of Germany ........ 60/618

Primary Examiner—Michael Koczo
Attorney, Agent, or Firm—Lorusso & Loud

[57] ABSTRACT

Disclosed are a method and apparatus for selectively generating different amounts of electric power and high pressure steam power according to the user's needs, using a fluid-cooled engine and a dual-function screw machine that may be operated as either a compressor or an expander. Fluid from a cooling jacket fluid is separated into vapor and liquid portions and, to increase the amount of high pressure steam delivered by the apparatus, low pressure steam from a separator is compressed by the screw machine and liquid from the separator is heated to a high temperature and high pressure. When additional electric power is desired, the low pressure steam from the separator is diverted from the screw machine. High pressure steam, manufactured by compressing and heating the liquid of the separator, is expanded in the screw machine, which adds its power to the main drive shaft, thereby adding to the available electric power. Various combinations of amounts of electric power and steam power are possible by controlling the amounts of material presented to the screw machine as either a compressor or an expander. The apparatus also includes a recirculation system used when the screw machine is employed as a compressor during periods of off-design point engine load and which facilitates driving the screw machine without drawing down the pressure of the apparatus.

23 Claims, 6 Drawing Figures

INTEGRATED MECHANICAL VAPOR RECOMPRESSION APPARATUS AND PROCESS FOR THE COGENERATION OF ELECTRIC AND WATER-BASED POWER HAVING A RECIRCULATION CONTROL SYSTEM FOR PART-LOAD CAPACITY

This is a continuation of co-pending application Ser. No. 921,966 filed on Oct. 22, 1986, abandoned.

This invention relates generally to the field of power generation. Specifically, this invention entails apparatus and a method for maximizing the use of heat produced by an internal combustion engine, such as a gas-fired engine, for the production of both electrical and water-based power. A novel aspect of this invention is the means by which high pressure steam and electric power may be generated at different times, using the same components. An additional novel aspect is apparatus and a method by which a positive displacement, dual-function expander and compressor may be used effectively at various engine loads.

BACKGROUND OF THE INVENTION

Industrial users and residential and office facilities having large physical plants frequently, typically require both electric and fluid-based power for economical operation of various machines and heating and cooling systems. Usually the fluid-based power is high pressure steam, however, low pressure steam and high pressure water are also useful. Because high pressure steam is most often desired, the fluid-based power will be alternatively referred to below as "steam power" or "fluid-based power", as is appropriate. Depending upon prevailing economic conditions, users obtain the needed power according to various means. In recent years, as a result of increases in energy cost, many users have installed power generating facilities of their own to supplement or replace the power formerly obtained from municipal public utilities. Typically, the users' systems consist of a prime mover engine that produces shaft work and heat in the form of hot exhaust gases and hot cooling jacket fluid. The engines are usually internal combustion engines such as gas-fired engines or diesel engines, however, they may also be turbine engines. The shaft work runs an electric generator that produces electric power.

The fuel to fire the main engine is relatively expensive. The efficiency of these engines is relatively low, typically between 30 and 40 percent. By this is meant that the engine converts only 30 to 40 percent of the heat energy produced by the chemical reaction of burning the fuel into useful shaft work. Most of the missing heat energy is converted into heat in the form of high temperature exhaust, and also the heat which raises the temperature of the physical body of the engine. In most engines, the heating of the body is minimized by heat transfer to a cooling medium known as the "cooling jacket fluid." There are several types of cooling jacket systems. In some cases, a fluid, usually water, flows through conduits in the cooling jacket and is maintained at a flow rate and pressure such that it does not boil. This fluid, after leaving the engine in liquid form, may be rapidly de-pressurized in a flash tank to produce at least some vapor. When water is used as the cooling fluid, this type of cooling is known as "flash steam" cooling. In other cases, pressure and flow rates in the cooling jacket are established so that the cooling jacket fluid boils as a result of heat transfer from the engine. This latter type of cooling system is known as an "ebullient" system.

As will be described below, the cooling jacket fluid is used by the described apparatus and method to store and transfer energy from one segment of the apparatus to another. Usually, the cooling fluid is water, however, other fluids are possible. As the fluid is circulated through different parts of the apparatus, it is transformed from a liquid phase, to a mixed liquid and vapor phase, to a vapor phase and back to a liquid phase. Therefore, it is helpful to refer to the fluid as an "energy transfer fluid" when the location and state of the fluid need not be specified. This terminology will be used in the claims and when appropriate, in the following description. However, because the most common energy transfer fluid is water, the terminology for water, e.g. "steam" "water" "water vapor", will be used in the examples to identify the specific status of the energy transfer fluid.

Water emerging from the jacket after cooling an engine typically is a two-phase mixture of vapor and liquid including steam at a relatively low pressure (for example, 15 psig). Neither the liquid nor the vapor is readily useable in this state. Often, however, the user requires either high pressure steam or high pressure, high temperature water.

Various means to upgrade the cooling jacket steam are known. For example, U.S. Pat. No. 3,962,873, to Davis, discloses taking the relatively low pressure steam generated in the cooling jacket and compressing that steam to a high pressure using a compressor driven by the shaft work of the main engine. Further, the hot exhaust gases are used to heat pressurized water so that the water becomes high pressure steam. The user may take advantage of these two constituents of high pressure steam.

Various types of compressors are known for compressing the lower pressure steam to high pressure steam, for instance screw compressors, piston compressors, centrifugal compressors, etc.

Depending upon the type of compressor used to compress the lower pressure stem to high pressure steam, another problem often arises during operation of the prime mover engine at less than its design point load. This problem arises with the use of positive displacement compressor devices. By "positive displacement" compressor devices is meant a device that, at a given operating speed, attempts to pass a constant volume flow rate through its compression path. For instance, a screw compressor with a main rotor rotating at X revolutions per second will attempt to draw Y cubic feet of steam per second through its operating cavity. When the engine operates at less than design point load it provides a smaller amount, by volume, of cooling jacket steam to the compressor. Consequently, if no accommodations are made, the normal volume flow rate of steam presented to the compressor will be less than the amount the compressor attempts to draw.

Typically, the main shaft of the engine drives the compressor. Even at off design point the main shaft rotates at the same speed; only the torque of the generator is reduced. The compressor will continue to operate at its design point speed, and continue to attempt to draw more volume into its cavity than the system readily presents. As a consequence, a suction will arise and it is possible that the compressor will draw down the operating pressure of the entire engine system. This draw-down may ultimately result in elevated engine operating temperatures. As a result of the generation of vapor bubbles inside the engine block this condition could damage the engine and cause a shutdown of the entire system.

It is known to augment the mass flow rate at the input of the compressor by drawing compressed steam from the output of the compressor and recirculating this steam, after processing, to the input of the compressor, thereby bringing the mass flow rate up toward the design rate. This solution has the drawback that the high pressure steam must first be brought to a reduced pressure. Further, during the compression, work has been done on the steam, which work is also manifest as an elevated temperature. Thus, the steam must be cooled before reintroduction to the compressor. Otherwise, its temperature might rise to undesireable levels in the compressor. Typically the heat exchanged is conducted to the atmosphere, with a consequent loss of heat energy. This is undesireable due to the fact that energy was expended to raise the steam to that temperature, and thus energy is being thrown away.

In connection with private power generation systems, it is frequently desirable to be able to vary the amount of high pressure steam generated and the amount of electrical power generated. For instance, a typical engine operating at design point generates a certain amount of electrical power. According to the methods discussed above, the heat normally lost due to the exhaust gases and the cooling jacket steam is converted into high pressure steam. However, in some cases it is desirable to convert these two forms of heat into additional electric power.

This flexibility serves several purposes. The most obvious, of course, is that during different times of the year, an industry may have different needs for its production of goods, and utilization of machinery. Thus, for instance, a company may manufacture a certain part during the summer months, which part requires the use of many electric-power machines. During the same time, it may not be necessary to use high pressure steam, either due to the high ambient temperature or other considerations. In this caes, it would be beneficial to be able to convert the heat of the exhaust gases and the cooling jacket system to electrical power, rather than a high pressure steam.

Power utility rate structures also provide incentive for having flexible capability with respect to electric power generation. Power utilities generally charge an overall rate based on the maximum load required by the user. If the maximum load is above a certain plateau, then all of the power costs more, whether the maximum load is exceeded at the time or not. In some instances, the utilities audit the user's power demands for a short period of time during the course of the year. Thus, during the audit period it is obviously to the user's advantage to reduce its peak load to below the somewhat arbitrary plateau. There may also be more than one plateau. Thus, if the user can provide a relatively small amount of electric power on its own, especially during the period of energy audit, it stands to significantly reduce its energy bill.

U.S. Pat. No. 3,350,876, to Johnson issued Nov. 7, 1967 discloses an apparatus by which water from a cooling jacket is heated by the exhaust gases to a high temperature (and a high pressure), and is thereafter expanded in a turbine expander to generate shaft work. In this case, the turbine is attached to the main engine shaft and thus contributes to the power delivered to the electric generator. A drawback of this method is that the turbine may be used beneficially only to expand high pressure steam which leaves the turbine expander as dry steam. This is because themechanical elements of the turbine are relatively delicate and finely machined. If the expanding steam were permitted to achieve a partially liquid state, the turbine would be subject to mechanical errosion. This degradation is due to the constant impinging of water particles upon delicate metal portions. The degradation is similar to that caused by water droplets dripping upon or running across a rock in a mountain stream. Further, the turbine would be subject to corrosion caused by the deposition of liquid upon the turbine elements.

As has been mentioned above, a power generation system is a complicated system that typically operates under relatively low efficiencies. Therefore, every increase in efficiency, even though apparently small in magnitude, has the potential for contributing significantly to the improved operation of the power system. Therefore, it is desireable to combine all of the operating improvements and conveniences mentioned above, into an integrated system that utilizes a minimum number of elements and that requires minimum maintenance.

Therefore, the several objects of the invention disclosed herein, as will be explained in the detailed discussion that follows, or that may be readily apparent to one ordinarily skilled in the art are as follows: To provide an apparatus and a method of power generation that produces both electric and steam poewr and that takes advantage of substantially all of the heat generated by the prime mover engine to produce either steam power or electric power; to provide an electric and steam power cogeneration system that produces a significant amount of high pressure steam and that may be operated at off design point load; to provide a steam power and electric power cogeneration system that permits a flexible choise of enhanced steam of electric power or both utilizing the same mechanical elements.

SUMMARY OF THE INVENTION

The present invention achieves the above-delineated objects by providing a screw machine that may be operated as both a compressor and an expander. The screw machine has a high pressure port and a low pressure port. When operating as a compressor, the low pressure port is the input and the high pressure port is the output. When operated as an expander, these roles reverse. The screw machine is attached to the main engine shaft through a gear box having forward, neutral and reverse direction choices. During periods of high steam demand, the screw machine operates as a compressor. The screw compressor compresses low pressure vapor drawn from the engine cooling jacket and separated from the liquid phase in a separator. The invention also entails pressurizing the liquid obtained from the cooling jacket system to high pressure and heating that liquid with the exhaust gases to create high pressure high temperature steam. Operating in this mode, the apparatus provides both electric power from the generator and high pressure, high temperature steam.

In order to drive the screw compressor during periods of less than design point load, without risk of pressure draw-down, a recirculation system is provided where high pressure steam from the output of the compressor is returned to the input of the compressor. Prior to reinjection at the input of the compressor, the steam passes through a heat exchanger, returning its heat to the system. The heat exchanger may be located within the separator tank. Thus, a portion of the heat added by the compressor is added to the liquid phase of the steam from the cooling jacket. Thus, more water may be heated by the exhaust gases. According to this arrangement, high pressure steam production need not be reduced drastically during times of low level engine activity.

During periods when the user need electric power more than steam power, the screw machine may operate in reverse as an expander. According to this mode of operation, the high pressure steam created by heating the liquid jacket fluid with the exhaust gases enters the high pressure port of the screw machine and drives the machine in a direction which is the reverse of that when the screw machine operates as a compressor. The shaft work generated by the expander is added to the shaft of the main engine, thereby increasing the electric power generation. The screw machine is not affected adversely to any substantial degree by expansion of the steam to a partial liquid phase. This is because the scrwe machine is a machine of substantial bulk having durable components, which are not deleteriously eroded or corroded by water.

DETAILED DESCRIPTION OF PREFERRED EMBODIMENTS

Figure 1:
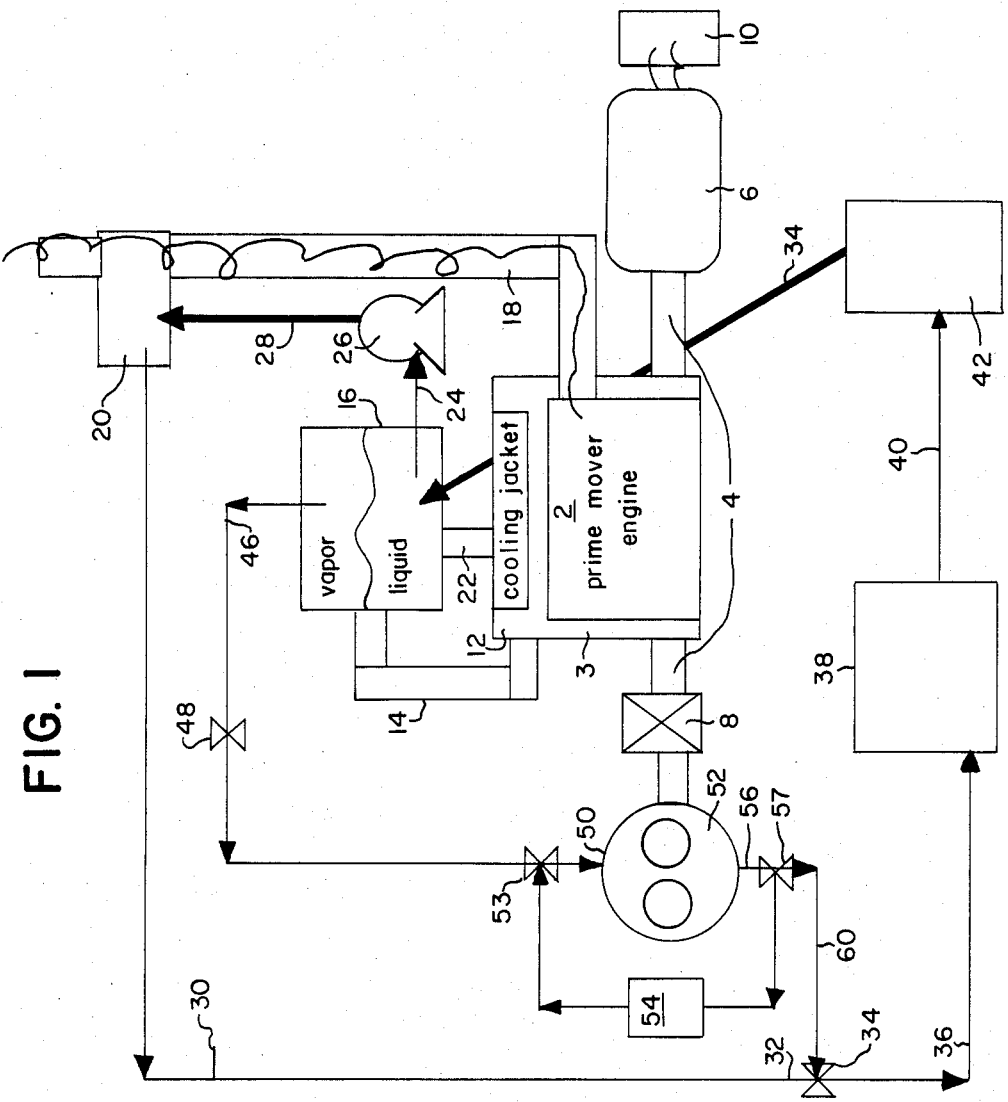
FIG. 1 shows a schematic rendition of the apparatus of the invention with the screw machine acting as a compressor and also showing in schematic form a recirculation system for the screw compressor.

FIG. 1 shows schematically the basic association of the components of the present invention, as configured during operations involving the production if high pressure steam. Except where otherwise noted, the individual elements are conventional, and are represented only schematically. An engine 2 is shown having a drive shaft 4 which is connectable to an electric generator 6 and a transmission gearbox 8. The engine 2 may be any of various conventional types, including internal combustion engines such as gas-fired and diesel engines. Similarly, the generator 6 may be any generator as is conventional in the art, of a size capable of accepting the power delivered by the engine and also of a size suitable for operating the machinery or processes under the user's control, shown schematically as user's electric power load 10.

As is well known in the art of power delivery, with engines deriving their power from the chemical reactions of burning fuel, a significant quantity of the energy produced by the chemical reaction is unavailable for producing shaft work to the generator, due to heating of the physical body of the engine. If not controlled, this heat transfer from the chemical reactants to the mechanical body of the engine would eventually result in destruction of the engine due to breakdown of its elements. Consequently, a cooling system is employed which may take many forms. A typical form includes a compartmentalized jacket 3 surrounding the engine, through whose tubes or chambers a cooling fluid such as water circulates. In some cases the pressure and flow characteristics of the cooling fluid are controlled such that the fluid remains liquid while in the jacket 3, then is depressurized in a flash tank to produce both vapor and liquid phases. This type of system is known as a "flash steam" system. In other cases, the pressure and flow characteristics of the fluid are controlled such that the fluid changes phase and becomes a two-phase mixture of steam comprising vapor and liquid. This latter type of cooling jacket system is known as an "ebullient system." Design of such flash steam and ebullient systems is well known to those of ordinary skill in the art.

If an ebullient system is employed, the product of the cooling jacket system leaves the engine body through port 12 as a two-phase mixture of low pressure vapor and liquid and travels through pipe 14 to a separator tank 16, which may be merely a tank providing gravitational separation of the liquid and vapor phases, or which may also include a heat exchanger for purposes to be discussed below. If a flash steam system is employed, the tank serves both to de-pressurize the fluid received from the jacket 3 and to separate the vapor and liquid phases resulting from de-pressurization. Hereafter, the tank 16 will be referred to as the separator 16 and the liquid and vapor phases of this fluid will be referred to as energy transfer liquid and energy transfer vapor, due to the fact that the fluid is not always located in the cooling jacket.

Heat from the chemical reaction also leaves the engine in the form of combustion gases at a highly elevated temperature. These gases leave the engine through conduit 18, rising to a heat exchange boiler 20, the purpose of which will be discussed below.

For purposes of this discussion, typical, yet to some extent arbitrary values of pressure and temperature have been chosen to illustrate the mode of operation. It is reasonable for the exhaust products to leave the engine at approximately 960° F. (516° C.). The energy transfer fluid, made up of both liquid and vapor, enters the separator 16 at approximately 250° F. (121° C.) and at 15 psig (206,843 Nt/m$^2$). (Atmospheric pressure in this discussion will be taken as 0 psig). In order to provide useful energy, process vapor should be at least about 65 psig (551,581 Nt/m$^2$) and, within limits, the higher the pressure the better.

At the separator 16, the two-phase energy transfer fluid divides into its liquid and vapor portions. The separator may also act as the receptacle for the condensate of the fluid, after the fluid has delivered its energy to the user's high pressure fluid load. A portion of the liquid in the separator returns to the engine cooling jacket through conduit 22, where it again begins the cycle. This liquid has mixed with the cooler liquid from the high pressure fluid load, however, it is still relatively hot. The flow rate and pressure of this liquid must be adjusted to provide characteristics that will effectively accept heat transfer from the engine.

Returning now to the separator 16, a portion of the energy transfer liquid drawn from the separator passes through conduit 24 to a typical liquid compressor 26. Compressor 26 increases the pressure of this liquid to approximately 100 psig (792,897 Nt/m$^2$). The temperature of the liquid is also raised somewhat due to the coupled relation between the pressure and temperature of the liquid. The liquid passes through conduit 28 to heat exchange boiler 20, where the liquid comes into heat exchange contact with the hot glue gases, which are at approximately 960° F. (516° C.). As a result of the heat exchange, the liquid at 100 psig is converted into vapor at approximately 100 psig. This high pressure vapor passes through conduit 30 to juncture 32 and throug valve 34 where it is available at point 36 for use by the user's high pressure fluid load 38.

Thus, by merely adding the energy necessary to compress the liquid at 250° F. (121° C.) and 15 psig (206,843 Nt/m$^2$) to 100 psig (792,897 Nt/m$^2$), the apparatus delivers high pressure vapor at 100 psig (792,897 Nt/m$^2$) and approximately 350° F. (177° C.). After delivering its energy to the high pressure fluid load, the energy transfer fluid leaves the load as liquid at high pressure through conduit 40. The liquid travels through a condensate return system 42 of a conventional design, which reduces the liquid's pressure. The condensate return system is connected through conduit 34 to the liquid zone of separator 16. The liquid flows from the condensate return system to the separator, where it again is distributed throughout the system as mentioned above, some to the cooling jacket, some to be compressed by pump 26 and some to return to the cooling jacket through conduit 22.

Turning now tothe conversion of the low pressure energy transfer vapor into high pressure vapor, the vapor phase of the low pressure two-phase liquid that is in the separator tank 16 leaves the separator tank through conduit 46 at 15 psig and at approximately 250° F. (121° C.). The energy transfer vapor passes through valve 48 and valve 53 into the input 50 of the screw machine 52.

Before detailing the phases of the compression of this low pressure energy transfer vapor, it is useful to return to a portion of the discussion mentioned in the background of the invention. As can be seen from FIG. 1, screw machine 52 is attached through gearbox 8 to engine 2. In general, the gearbox will permit the wcrew machine to be operated at only one speed albeit in both forward and reverse directions. Thus, if the engine is firing, the screw machine will be rotating at this given speed. Sometimes it is beneficial to operate the engine at less than its design point load. During those periods, it is necessary to alter the operation of the screw machine through means of the recirculation system indicated schematically at 54. Those conditions, known as "off-design point", will be discussed below. The discussion immediately following deals with the times when the engine is operating at design point.

The screw machine is a positive displacement machine, which exists in a variety of forms. Basically, it consists of a pair of rotors which have surfaces designed to mate with each other. Generally, each rotor has a set of longitudinally arranged helical ribs. The ribs of one rotor, the "male rotor" are designed to engage in the grooves between the ridges of a "female rotor." The shape of the male and female portions of the two rotors are desinged to accommodate a volume of the fluid being compressed. The volume between the rotors decreases as one proceeds in a direction toward the output of the machine when used as a compressor. Thus, fluid initially trapped in the input of the compressor passes into the gaps between the ribs. As the ribs mesh due to rotation of the rotors, the fluid is forced toward the opposite end and is compressed. The compressed fluid leaves teh compressor at the compressor exit port 56 and passes through valve 57 and conduit 60 to juncture 32 where it joins the flow of the high pressure energy transfer vapor that has been created by heat transfer from the exhaust gases to the pressurized energy transfer liquid. After this point, the passage of the vapor through the high pressure load of the user and the condensate return system is identical to that as has been described above.

Figure 2:
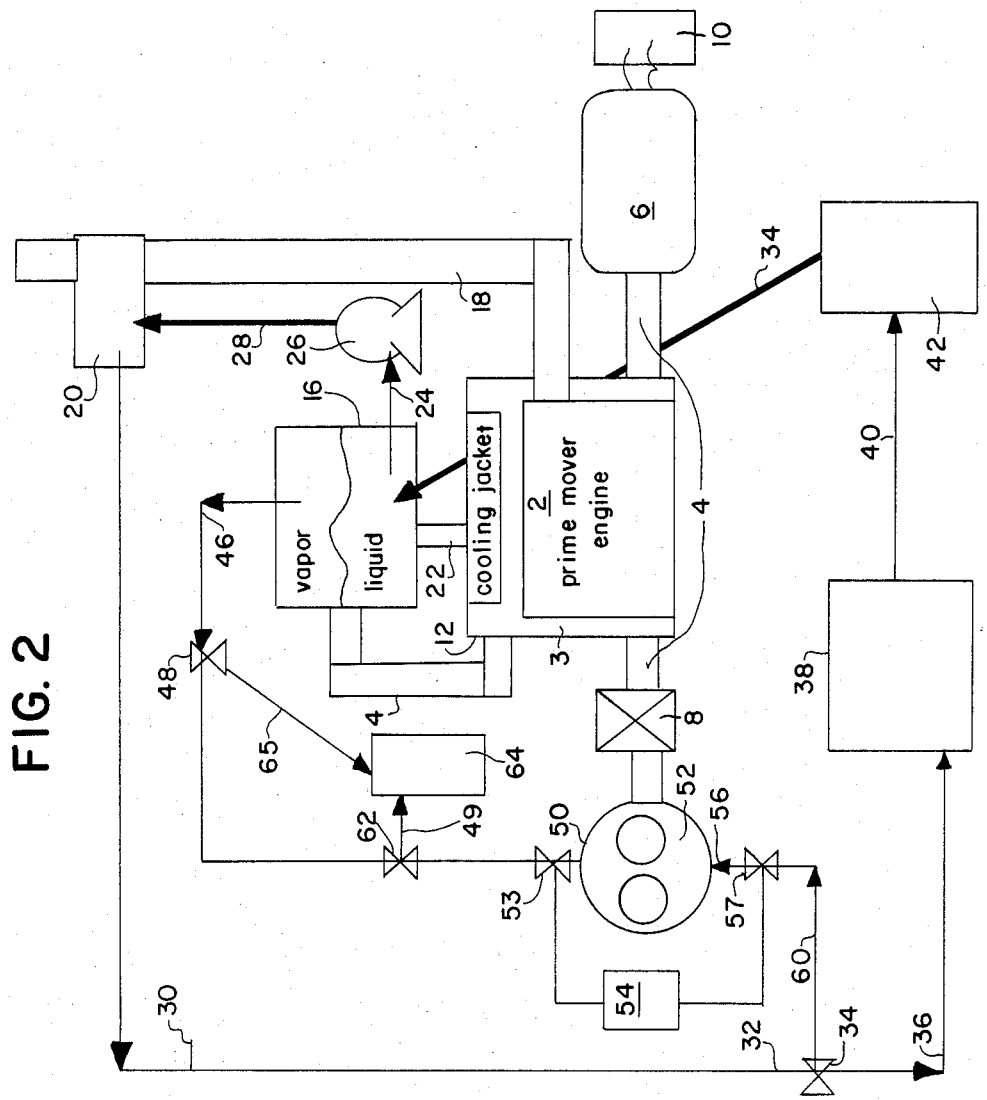
FIG. 2 shows a schematic rendition of the apparatus of FIG. 1, with the screw machine operating as an expander.

The system as described above, except for the specific use of the screw machine as the compressor, is known to the prior art. One novel aspect of the present invention is shown in FIG. 2, as will be described below. According to this aspect, the screw machine 52 is used as an expander, to expand high pressure vapor to a low pressure and to convert the energy in the high pressure vapor to shaft work that can be delivered to the electric generator.

Turning now to FIG. 2, like elements are identified by identical reference numerals as were those elements in FIG. 1.

As has been mentioned above, at times it is more beneficial to the user to produce additional electric power rather than to use all of the "waste" heat in the production of high pressure a vapor. According to the present invention, it is possible to use the same screw machine to convert the energy of this high pressure vapor into electric power.

As can be seen from FIG. 2, the system is virtually identical to that of FIG. 1 except for the following differences. Valve 48 is closed so that low pressure vapor in conduit 46 may not pass to port 50 of the screw machine. Further, port 50 of the screw machine is connected through valve 62 through conduit 49 to condenser 64. Valves 53 and 57 are set to cut the recirculation system 54 out of the screw machine operation. Finally, valve 34 is adjusted so that the desired quantity of high pressure vapor arrives at the user's high pressure fluid load 38 and the desired quantity arrives at the screw machine's high pressure port, 56.

During the mode of operation illustrated in FIG. 2, the screw machine 52 is used as an expander. Therefore, the low pressure vapor from the separator is not converted into high pressure vapor by the screw machine. The treatment and use of this low pressure vapor is discussed below.

According to this mode of operation, the exhaust gas from the engine 2 is still used in boiler 20 to produce high pressure vapor from the liquid drawn from the separator tank 16 and pressurized in the compressor 26. By adjusting valve 34, a portions of this high pressure vapor, up to 100%, is directed from point 32 through conduit 60 to the high pressure port 56 of the screw machine operating as an expander. (It should be recalled that input port of 56 of the screw expander is the output port 56 of the screw machine 52 when operating as a compressor.) The amount of vapor that passes to the screw machine, and thus which is available for the creation of electric power, is controlled by adjustment of the valve 34. Thus, within a certain range, some of this high pressure vapor may be used to create additional electric power, while the remaining portion of the steam is available to the user's high pressure fluid load.

In this mode of operation, high pressure vapor passes through the screw machine and drives the screw machine in the opposite direction from that in which it runs during the compression mode. During this expansion operation of the screw machine, the gearbox 8 must be set so that the screw machine drives the main shaft of the engine and adds to its power. The expanded energy transfer fluid leaves the screw machine through low pressure port 50 and enters conduit 49. At this stage, a portion of the energy transfer vapor has become liquid.

It is because of this conversion to a two-phase liquid/vapor fluid, that the scrw machine is particularly suited as the expander/compressor in this system. This is because screw machines are machines that are typically relatively "beefy." By beefy, it is meant that the machine elements are substantial and relatively rigid, made up of a lot of metal. Machine components will not be eroded or flexed to any significant degree due to the impingement of the high energy liquid particles as they fly through the expander. Further, it can wtihstand the corrosive effects of theliquid phasae of the fluid.

In principle, other compressors may also be used as expanders. However, it is important to maintain the expanding fluid in an entirely vapor phase for the use of certain compressor/expanders, such as turbines. This is because most such devices are relatively delicate in design having thin metal blades and vanes which are positioned and formed within tight tolerances. This need is disclosed in U.S. Pat. No. 3,350,876, identified above, where it is stated that a turbine expander may be used, but that it is important to maintain the phase of the expanding fluid as a dry vapor.

After the fluid leaves the expander through valve 62, it passes through conduit 49 into condenser 64. In condenser 64, the fluid is in heat exchange with a lower temperature medium and the fluid temperature is reduced, as is the pressure. As was mentioned above, the low pressure energy transfer vapor from the separator tank 16 is not converted into high pressure vapor according to this embodiment. The condenser 64 may also reduce the temperature of the low pressure vapor entering it from the separator tank 16 along the conduit 65. The design of the condenser will be obvious to one of ordinary skill in the art. The condenser may be arranged so that it is in heat exchange relationship with the heating system of a building. The temperature and pressure of the condenser fluid at this point will be amenable to use in such a system.

Figure 3:
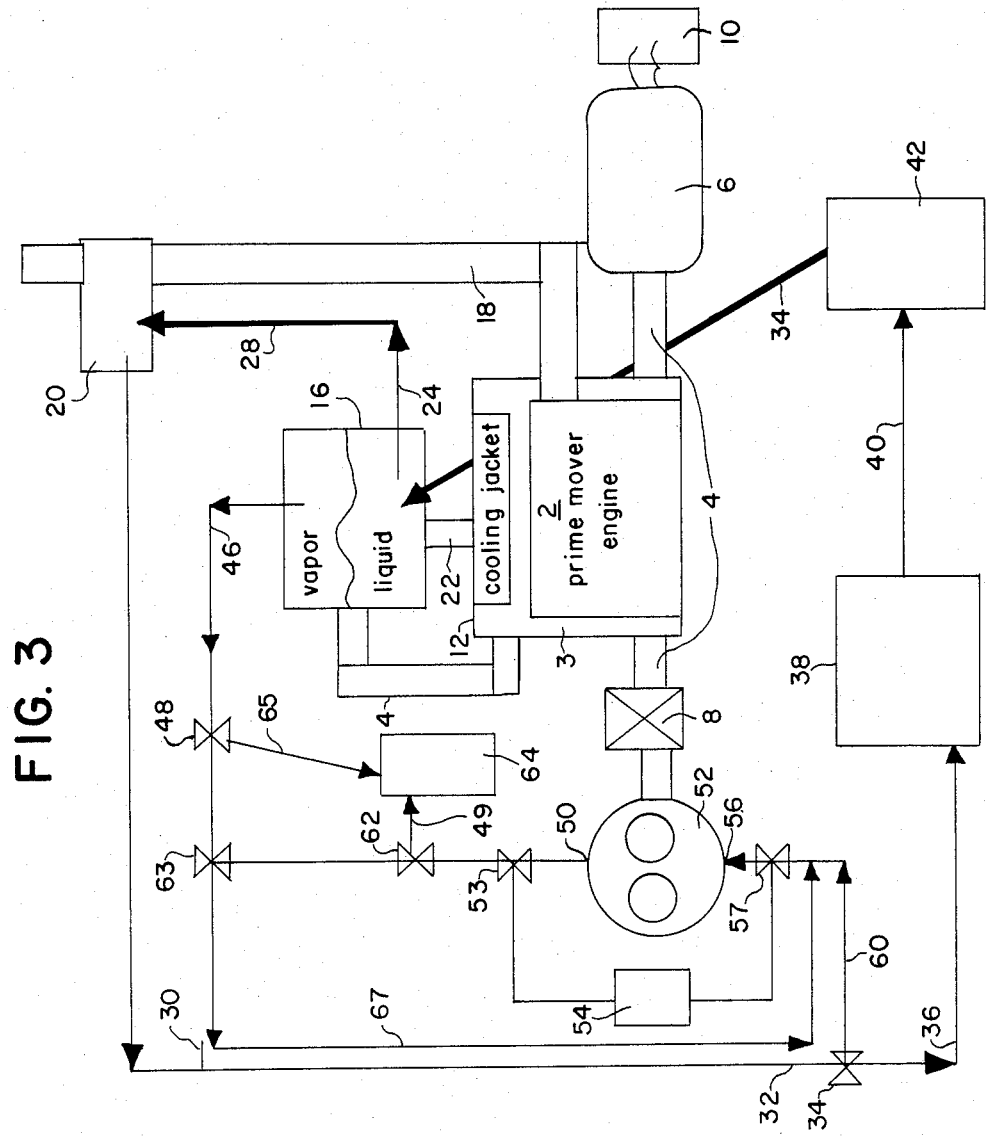
FIG. 3 shows a schematic rendition of another embodiment of the apparatus with an auxiliary compressor absent and including a large condenser to be used when the user desires relatively low pressure hot water.

Turning now to FIG. 3, another embodiment of the invention is shown where the liquid from the separator tank 16 is not pressurized by a compressor prior to its passage through the boiler 20. According to this mode of operation, which is used when electric power is more desirable than high pressure vapor, the energy transfer liquid passing through the boiler 20 with the exhaust gases is converted into low pressure vapor and directed through conduit 30 past point 32 and through conduit 60 to the high pressure port 56 of the screw expander 52. In order to achieve the required pressure differential between the input of the screw machine and the output of the screw machine, a large condenser 64' may be used. If the condenser 64' is large enough, with a large area for heat exchange, the condenser will draw the pressur at the exit port of the screw compressor sufficiently low so that the screw machine may be operated to expand even the relatively low pressure vapor at 15 psig. According to this mode of operation, electric power may be generated without the necessity of adding energy to the low pressure fluid by means of the fluid compressor 26 shown in FIG. 2. If the user is capable of accepting more electric power, the low pressure vapor fromthe separator tank may also be presented to the high pressure port 56 of the screw expander and through valves 48 and 63, and conduit 67 and may be expanded as was the low pressure vapor resulting from heating the separator liquid. This is the mode of operation that provides the most additional electrical power. In this case, approximately 15-25% addtional prime mover engine power can be made available to generate electricity. If the user cannot accept the electric power that would be generated by expansion of all of the low pressure energy transfer vapor, controlled amounts of the vapor may be diverted to the large condenser 64' through valve 48 and conduit 65.

Screw-machine recirculation techniques for use at off-design operation of the invention will now be discussed with reference to FIGS. 4 and 5.

As has been explained above, when the generator 6 is operating at less than design point load, the volume flow rate of vapor leaving the separator tank is reduced. Because the screw machine 52 is a positive displacement device, it always attempts to draw the same volume flow rate dv/dt through it. The screw machine always comsumes its design point power requirement. If not regulated, it is possible that the screw machine will draw down the pressure of the entire system to below acceptable levels. The aim of regulation is to maintain design point conditions at the input of the compressor. This is done by recirculating a portion of the output from the compressor back to a stage before the input.

Figure 4:
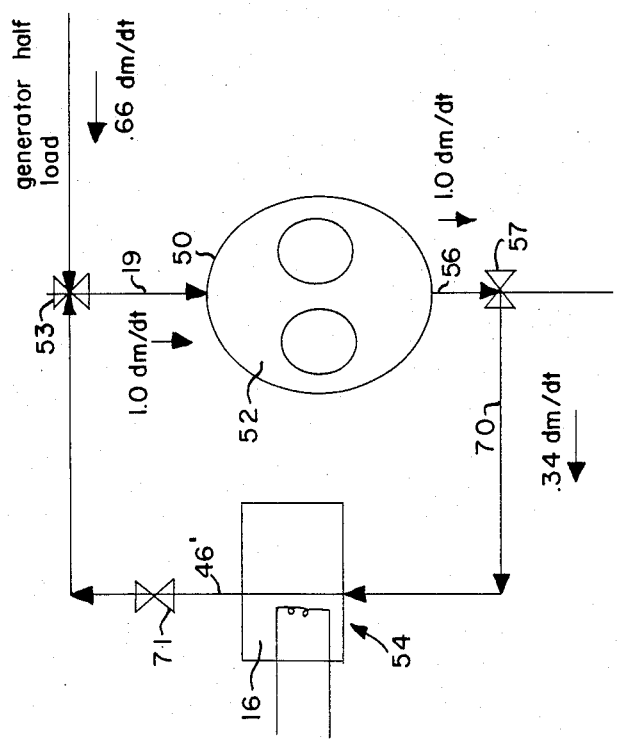
FIG. 4 is a schematic rendition of the screw compressor recirculation system according to an embodiment where the heat exchange takes place in the separator tank.
Figure 6:
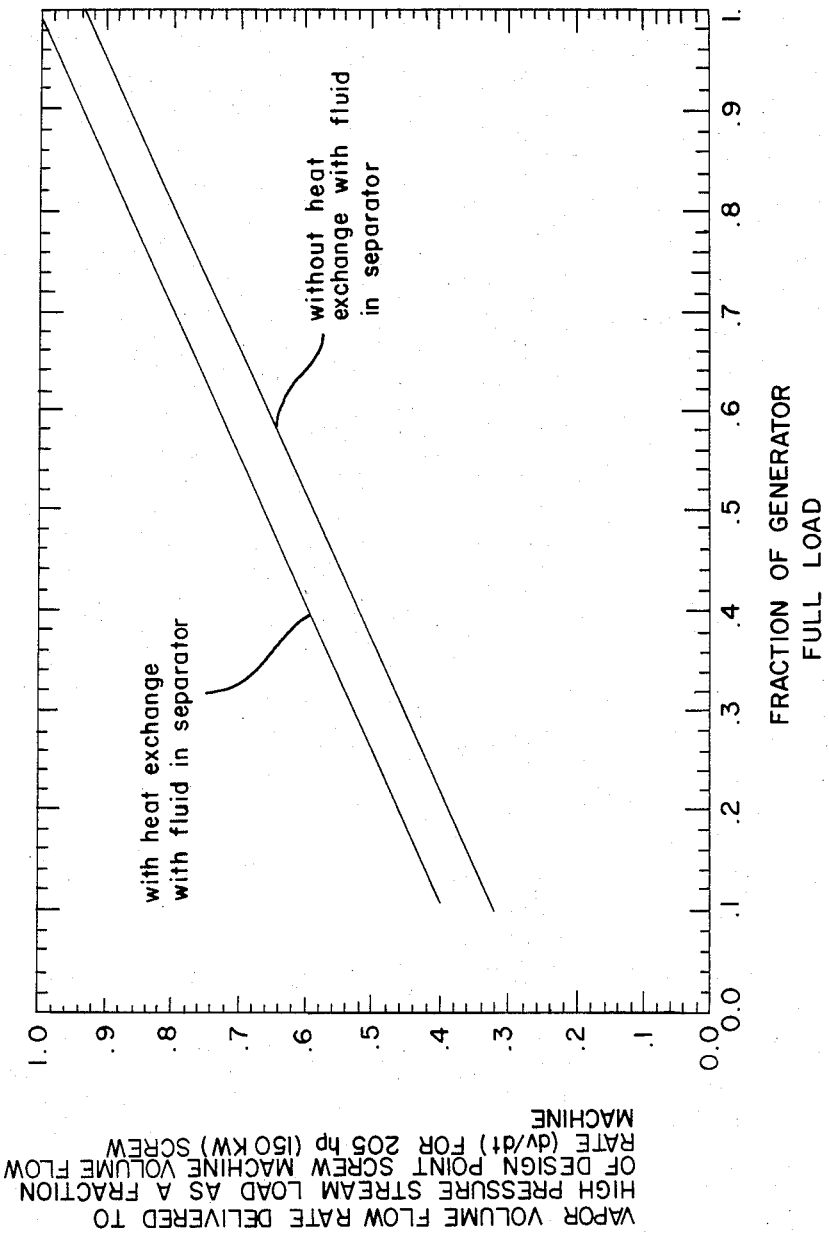
FIG. 6 is a graphical representation of the vapor volume flow rate delivered to the high pressure steam load as a fraction of the design point screw machine volume flow rate for a 205 hp (150 KW) screw machine, depicting the vapor volume flow rate for two recirculation schemes.

As can be seen from FIG. 4, the volume flow rate of vapor generated by the cooling jacket 3 at electric generator partload and at standard operating density and pressure may amount to 0.66 dv/dt. The volume flow rate at part load depends on two factors: the fraction of part load to full load and the power requirements of the screw machine. The lower curve in Fig. 6 shows that the amount of steam is, in general, directly proportional to the fraction of generator full load, shifted upward by a factor for the screw compressor. The screw compressor 52 requires 1.0 dv/dt. The deficiency may be made up by drawing 0.34 dv/dt of compressed vapor from the output 56 of the screw compressor and diverting that amount of vapor through valve 57 and conduit 70, back to a point along a path that ultimately returns to the input 50 of the screw compressor.

As has been discussed above, because the screw compressor 52 adds energy to the vapor, the vapor exits the compressor at an elevated temperature and an elevated pressure. It is necessary to reduce both the pressure and the temperature to avoid overheating the screw compressor. The pressure may be reduced simply by passing the fluid through a throttling valve 71. Further, the temperature may be reduced by causing the fluid to pass in heat exchange relationship with a temperature sink. As has been mentioned above, simply having the temperature sink dump the heat into the atmosphere would waste some of the energy provided by the screw compressor. It is an aspect of this invention to recover that heat by having the heat exchange take place within the separator tank 16. Thus, as seen in FIG. 4, the conduit 70 actually passes through the liquid zone of the separator tank 16 so that the fluid in conduit 70 is cooled somewhat while heating the liquid contained in the separator tank. Conduit 46' then conducts this cooled fluid to valve 53 where is combines with the vapor supplied by the cooling jacket 3. In this manner, the flow rate of vapor presented to the input of the screw compressor is 1.0 dv/dt. In this manner, the heat added by the screw compressor is not lost, but rather is returned to the fluid in the separator tank. This heat may then be used to heat additional fluid, generating more vapor.

FIG. 6 shows schematically the effect of a heat exchange in the separator. The lower curve depicts the part load vapor volume flow rate delivered without heat exchange in the separator. The upper curve depicts the vapor volume flow rate delivered with heat exchange in the separator. As can be seen, the heat exchange increases the volume flow rate (and thus the mass flow rate) by approximately 10% at a 50% generator load.

Figure 5:
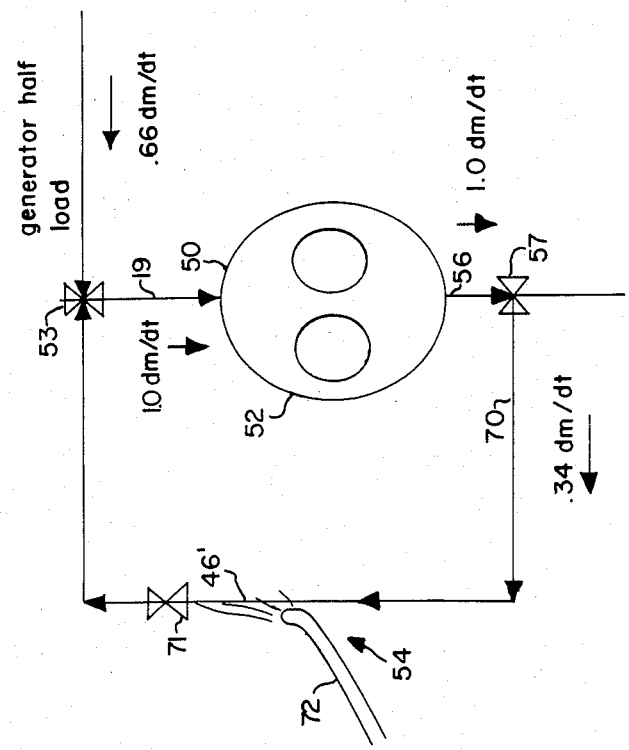
FIG. 5 is a schematic rendition of the screw compressor recirculation system according to an embodiment where the heat exchange takes place according to spraying of cooling liquid upon the hot fluid.

Another method of recirculation is shown in FIG. 5. The apparatus shown in FIG. 5 works in a manner analogous to the subsystem of FIG. 4. However, rather than the conduit 70 passing through the separator tank 16, a spray device 72 joins the conduit 70 and sprays lower temperature liquid drawn from the separator into the stream of the high temperature compressed vapor. After the sprayed liquid cools down the recirculating liquid, the sprayed liquid returns to the separator, where its heat is used to heat more fluid to operating temperatures. A throttling valve 71 is provided downstream as in the embodiment shown in FIG. 4. The mixture of the liquid from spray device 72 with the high pressure vapor reduces the temperature of the high temperature vapor, and also converts the liquid into low pressure vapor. Typically, this sprayed liquid may be provided from the separator tank 16 and thus the heat added by the work done by the compressor is again contributed back to the fluids used in the system.

Generally, for a main engine it is still economical to use the screw compressor to create high pressure steam in addition to electrical power when the engine is operating at 50% design point or greater. FIG. 6 shows the theoretical relative values of vapor mass flow rate delivered to the high pressure steam load that can be expected at a given generator part load for a particular size of screw machine.

Thus, as can readily be seen, the scheme presented according to this invention provides multiple means for using as much of the heat of the engine as possible for whichever type of power is desired. With respect to the basic efficiencies of the screw machine and the heating of the energy transfer liquid by the exhaust gases, it is normally more efficient for the user to produce high pressure vapor first by means of the exhaust gases heating the energy transfer liquid. If the user is capable of accepting additional high pressure vapor, then the screw compressor should be run in the compression direction to compress the vapor from the separator so that high pressure vapor can be produced in that manner.

EXAMPLE 1

For a typical arrangement of the power generating apparatus with the screw machine engaged as a compressor to provide maximum high pressure steam, the following parameters and state conditions exist. A fuel input of $6.8 \times 10^6$ BTU/hr (2000 KW) is provided to a gas-fired engine having an efficiency of 30%. The engine has a design point of 804 horsepower (600 KW) and drives a 600 Horsepower (450 KW) electric generator. The flue gases arrive at the boiler 20 at approximately 950° F. (510° C.). The cooling jacket vapor leaves the separator at approximately 250° F. (121° C.) and 15 psig (206,843 Nt/m$^2$) at 2,200 pounds (1,100 Kg) per hour. Liquid will be drawn from the separator to the compressor at 15 psig (206,843 Nt/m$^2$) and 250° F. (121° C.) at 1,400 pounds per hour (636 Kg/hr). The compressor pressurizes this to approximately 100 psig (792,897 Nt/m$^2$) at 350° F. (177° C.). The water is heated by the exhauste gas to 350° F. (177° C.), which becomes saturated steam at 100 psig (792,897 Nt/m$^2$). This steam is delivered to the high pressure steam load of the user at approximatey 1,400 pounds per hour (636 Kg/hr).

The screw compressor is connected to the main drive shaft of the engine so that it receives approximately 205 horsepower (153 KW). The screw machine draws ito its compression chamber approximately 2,200 pounds (1,100 Kg) of steam per hour at 15 psig (206,843 Nt/m$^2$) and 250° F. (121° C.). Water is injected into the compressor inlet to reduce the outlet temperature resulting in a mass flow rate of steam of 2600 pounds/hr leaving the compressor at 100 psig (792,897 Nt/m$^2$). This steam is added to the high pressure steam from the line heated by the exhaust gases to produce a total amount of high-pressure steam of 4,000 pounds (1,818 Kg) per hour at 100 psig (792,897 Nt/m$^2$). According to this process, 30% of the fuel energy is made available as high pressure steam. 22 to 24% of the fuel energy is available as electric power. Without the cogeneration and screw compressor, 30% of the fuel energy would be available as electric power, and 30% would be available as low pressure steam. Thus, by giving up a portion of available electric power, a user may convert the low pressure steam to generally more useful high pressure steam.

EXAMPLE 2

For a typical arrangement of the power generating system when additional electric power is desired and with the screw machine engaged as an expander to provide additional electric power, the following parameters and state conditions exist. $6.8 \times 10^6$ BTU/hr (2000 KW) of fuel is provided to a gas-fired engine having an efficiency of 30%. The engine has a design point of 804 hp (600 KW) and drives an 880 Hp (665 KW) generator. The engine, as above, delivers shaft work of 804 hp (600 KW). The flue gases arrive at the heat exchange boiler 20 at approximately 950° F. (510° C.). The cooling jacket steam leaves the separator at approximately 250° F. (121° C.) and 15 psig (206,843 Nt/m$^2$) at 2,200 pounds (1,000 kg) per hour. Jacket liquid is drawn fromthe separator to the compressor at 15 psig (206,843 Nt/m$^2$) and 250° F. (121° C.) and at 1400 pounds (636 Kg) per hour. The compressor pressurizes this liquid to approximately 100 psig (792,897 Nt/m$^2$) and 350° F. (177° C.). The liquid is heated by the exhaust gas to 350° F. (177° C.) where it becomes saturated steam at 100 psig (792,897 Nt/m$^2$). This steam is delivered to the high pressure port of the screw machine at approximately 1,400 pounds (636 kg) per hour.

The screw machine is connected to the main drive shaft of the engine. The screw machine draws the high pressure steam into its expansion chamber. The expanded steam leaves the low pressure port at 15 psig (206,843 Nt/m$^2$) and enters the condenser 64. The fluid leaves the condenser at 15 psig as steam. 2,200 pounds (1,000 kg) per hour of jacket steam at 250° F. (121° C.) and 15 psig (206,843 Nt/m$^2$) also enters the condenser and joins the flow from the screw expander. The combined flow passes through a heat exchanger which communicates with a heating system providing a temperature source at 250° F. (121° C.), flowing at 3600 pounds (1636 Kg) per hour. According to this process, 87 hp (65 KW) is provided by the gas expanding in the screw expander, providing an additional 3% of the chemical fuel power as available electric power. This increases the available electric power by 10%.

EXAMPLE 3

For a typical set up of the power generating system when additional electric power is desired and with the screw machine engaged as an expander to provide maximum additional electric power, the following parameters and state conditions exist. 6.8×10$^6$ BTU/hr (2000 KW) of fuel is provided to a gas-fired engine having an efficiency of 30%. The engine has a design point of 804 hp (600 KW) and drives an 1005 hp (750 KW) generator. The engine, as above, delivers shaft work of 804 hp (600 KW). The flue gases arrive at the heat exchange boiler 20 at approximately 950° F. (510° C.). The cooling jacket vapor leaves the separator at approximately 250° F. (121° C.) and 15 psig (206,844 Nt/m$^2$) at 2,200 pounds (1,000 Kgs) per hour. Jacket liquid is drawn from the separator to the exhaust gas boiler at 15 psig (206,844 Nt/m$^2$) and 250° F. (121° C.) at 1,400 pounds (637 Kg) per hour. The liquid is heated by the exhaust gas to 250° F. (121° C.), where it becomes steam at 15 psig (206,844 Nt/m$^2$). This steam is delivered to the high pressure port of the screw machine at approximately 1,400 pounds (636 Kg) per hour. The vapor from the separator is at 250° F. (121° C.) and 15 psig (206,844 Nt/m$^2$). This vapor is also conducted to the high pressure port of the screw machine at approximately 2,200 pounds (1,000 Kg) per hour.

The screw machine is connected to the main drive shaft of the engine. The screw machine draws the steam into its expansion chamber. The expanded steam leaves the low pressure port at 2 to 4 psig (1370 Nt/m$^2$ to 2758 Nt/m$^2$) and enters the condenser 64. The fluid leaves the condenser at 2 to 4 psig. The expanding steam generates 201 hp (150 KW), which is conducted to the generator as shaft work. According to this process, 7.5% additional power of the fuel is made available as a electric power. This provides 25% more electric power than was available without any expansion of steam.

EXAMPLE 4

As an example of a typical operation during 50% partial load operation of the engine, the following design parameters and conditions obtain. 4.25×10$^6$ BTU/hr (1,250 KW) of fuel is provided to a gas-fired engine having an efficiency of 30%. The design point load is 600 hp (450 KW), however, only 300 hp (225 KW) is desired. The engine delivers shaft work of 505 hp (378 KW) of which 205 hp (153 KW) drives the screw compressor. The flue gases emerge at less than 950° F. (510° C.). The cooling jacket vapor leaves the separator at approximately 1375 pounds (625 Kg) per hour, at 250° F. (121° C.) and 15 psig (206,843 Kg/m$^2$). Liquid is drawn from the separator to the compressor at 15 psig (206,843 Kg/m$^2$) and 250° F. (121° C.). The compressor pressurizes this liquid to approximately 100 psig (792,897 Kg/m$^2$) at 350° F. (177° C.). The liquid is heated by the exhaust gas to 350° F. (177° C.), where it becomes saturated steam at 100 psig (792,897 Kg/m$^2$). This steam is delivered to the high pressure steam load of the user at approximately 875 pounds (398 Kg) per hour.

The screw compressor is connected to the main drive shaft of the engine receiving approximately 204 horsepower. The screw machine must draw into its compression chamber approximately 30,000 ft$^3$ of steam per hour at normal operating pressure and density. If a sufficient volume of steam is not provided to the screw compressor input, it will draw the pressure of the system down to approximately 3 psig. Without recirculation, 50% of partial load of only 1,375 pounds (625 Kg) per hour of steam would be presented. Saturated vapor at 250° F. (121° C.) and 15 psig (206,844 Nt/m$^2$) has a density of 0.0723 pounds per ft$^3$. Thus, 1,375 pounds per minute amounts to 19,018 ft$^3$ per hour. A recirculation route makes up the deficiency by drawing 825 pounds (375 Kg) of steam per minute from the output of the compressor, and returning that high pressure steam to the separator. This amounts to approximately 11,000 ft$^3$ per hour. As a result of recirculation, 2,200 pounds (1,000 Kg) per hour of low pressure steam enters the compressor and a total of 1,375 pounds (625 Kg) per hour of high pressure steam is made available for use. This mass flow rate of steam is added to the high pressure steam from the line heated by the exhaust gases to produce a total amount of high pressure steam of 2,250 pounds (1,022 Kgs) per hour. 825 pounds (375 Kg) per hour is recirculated.

As an example of the improved efficiency of the recirculation system, in a conventional system where the heat from the compressed steam is not recovered, when the engine operates at a 50% load, only about 50% of the design point steam could be delivered to the user. As is shown in FIG. 6, by recirculating and including the heat exchanger within the separator tank, approximately 66% of the design point steam may now be delivered to the user. This system may be used for engines and generators of different sizes.

Of course, the foregoing description is meant to be illustrative and not limiting in any manner. Modifications and variations embodying the inventive concept will be understood by those of ordinary skill in the art.

For instance, any compressor/expander device may be used, such that under the operating conditions existing at the time, the device will nt deteriorate. For example, at relatively high temperatures, where the expanded gas does not enter the liquid phase, more delicate devices such as turbines may be used.

Having thus described the invention, what is claimed is:

1. An apparatus for the cogeneration of electric power and fluid-based power to be provided to an electric load and fluid power loads respectively, designed to make use of a maximum amount of generated heat, comprising:
    (a) an engine for converting chemical energy stored in fuel to heat energy and shaft work, said engine operable to produce shaft work deliverable to a rotatable main engine shaft and to produce hot exhaust gas;
(b) a cooling jacket for the engine, said cooling jacket, during operation of the engine, containing an energy transfer fluid which exchanges heat with said engine and circulates through said cooling jacket and other portions of the apparatus;
(c) an electric generator connected to a first end of the main engine shaft;
(d) a gearbox connected to a second end of the main engine shaft, said gearbox having individually selectable forward and reverse gears;
(e) operatively connected to said gearbox, a positive displacement dual-function compressor and expander, having a high pressure port and a low pressure port;
(f) separator means connected to said cooling jacket for separating the energy transfer fluid into liquid phase and vapor phase portions;
(g) heat exchange means for providing heat exchange between the hot exhaust gas of the engine and the liquid energy transfer fluid;
(h) means for conducting liquid energy transfer fluid from the separator means to the heat exchange means;
(i) means for conducting the energy transfer fluid from the heat exchange means to a fluid power load;
(j) means for conducting the vapor phase of the energy transfer fluid from the separator means to the low pressure port of the dual-function compressor and expander; and
(k) means for connecting the high pressure port of the dual-function compressor and expander to a fluid power load.

2. The apparatus of claim 1 wherein said dual-function compressor and expander comprises a positive displacement machine that is insensitive to erosion and corrosion effects of said liquid energy transfer fluid.

3. The apparatus of claim 2 wherein said dual-function expander and compressor comprises a screw machine.

4. The apparatus of claim 3 wherein said energy transfer fluid is water.

5. The apparatus of claim 4 further comprising
means for selectively diverting a portion of said energy transfer fluid from said fluid power load, to said high pressure port of said dual-function compressor and expander; and
means for selectively diverting said vapor energy transfer fluid from said low pressure port of said dual function expander and compressor.

6. The apparatus of claim 5 further comprising a condenser connected to said means for diverting said vapor energy transfer fluid.

7. The apparatus of claim 6, further comprising
means for connecting said low pressure port of said dual-function expander and compressor to said condenser.

8. The apparatus of claim 3 further comprising recirculation means for increasing the mass flow rate of energy transfer fluid flowing through said low pressure port of said dual-function compressor and expander, by recirculating energy transfer fluid from said high pressure port of said dual-function compressor and expander to said low pressure port of said dual-function compressor and expander.

9. The apparatus of claim 8 further comprising:

means for reducing the pressure of the energy transfer fluid flowing through said recirculation means; and
means for reducing the temperature of the energy transfer fluid flowing through said recirculation means.

10. The apparatus of claim 9, wherein said means for reducing the temperature of the energy transfer fluid is located within the separator means.

11. The apparatus of claim 9, wherein said means for reducing the temperature of the energy transfer fluid comprises means for spraying liquid of a lower temperature than said energy transfer fluid on said energy transfer fluid.

12. The apparatus of claim 11, wherein said means for spraying liquid is operable to draw said liquid from said separator means.

13. The apparatus of claim 3, further comprising means interposed between the separator means and the heat exchange means for pressurizing the liquid phase portion of energy transfer fluid.

14. The apparatus of claim 13, further comprising recirculation means for increasing the mass flow rate of energy transfer fluid flowing through said low pressure port of said dual-function compressor and expander by recirculating energy transfer fluid from said high pressure port of said dual-function compressor and expander to said low pressure port of said dual-function compressor and expander.

15. The apparatus of claim 6 further comprising means interposed between the separator means and the heat exchange means for pressurizing the liquid phase portion of energy transfer fluid.

16. The apparatus of claim 5 further comprising:
(a) a means for selectively diverting a portion of said energy transfer fluid from said fluid power load, to said high pressure port of said dual-function compressor and expander;
(b) means for selectively diverting said vapor energy transfer fluid from said low pressure port of said dual-function expander and compressor to said high pressure port of said dual-function expander and compressor; and
(c) a condenser connected to said low pressure port of said dual-function compressor and expander.

17. A method for the cogeneration of electric power and fluid-based power to be provided to an electric load an a fluid power load, respectively to make use of a maximum amount of generated heat comprising the steps of:
(a) providing:
(i) an engine, a cooling jacket having energy transfer fluid for cooling said engine, and a rotatable main engine shaft having two ends;
(ii) an electric generator connected to a first end of the main engine shaft;
(iii) a gearbox connected to a second end of the main engine shaft, said gearbox having individually selectable forward and reverse gears; and
(iv) a positive displacement dual-function screw machine compressor and expander, having a high pressure port and a low pressure port, said screw machine being insensitive to erosion and corrosion by said energy transfer fluid, said screw machine being operatively connected to said gearbox;

(b) converting the chemical energy stored in fuel to shaft work and heat energy by combusting said fuel in said engine;

(c) operating said electric generator with said shaft work;

(d) heating said energy transfer fluid in the cooling jacket with a first portion of said heat energy;

(e) providing exhaust gases from said engine, said exhaust gases being heated with a second portion of said heat energy;

(f) separating said energy transfer fluid into a liquid phase portion and a vapor phase portion;

(g) bringing said liquid phase portion of said energy transfer fluid into heat exchange relation with said hot exhaust gases to provide heated vapor phase energy transfer fluid;

(h) delivering said heated vapor phase energy transfer fluid to a fluid power load;

(i) conducting said vapor phase portion to said energy transfer fluid to the low pressure port of the dual-function compressor and expander;

(j) compressing said vapor phase of the energy transfer fluid with said dual-function compressor and expander to provide a high pressure vapor phase; and (k) conducting said high pressure vapor phase of the energy transfer fluid to a fluid power load.

18. The method of claim 17 further comprising the steps of:

(a) selectively diverting a portion of said heated vapor phase energy transfer fluid from said fluid power load and directing said diverted fluid to said high pressure port of said dual-function compressor and expander;

(b) diverting said vapor portion of said energy transfer fluid from said low pressure port of said dual-function expander and compressor;

(c) generating shaft work with said dual-function compressor and expander by expanding said diverted heated vapor energy transfer fluid to a lower pressure with said dual-function compressor and expander; and (d) adding said shaft work to said engine shaft and thus to said generator through said gearbox.

19. The method of claim 18 further comprising the step of providing a condenser connected to said low pressure port of said dual-function expander and compressor and condensing said expanded heated energy transfer fluid.

20. The method of claim 17 further comprising the step of increasing the mass flow rate of energy transfer fluid flowing through said low pressure port of said dual-function compressor and expander during periods of off design point engine load, by recirculating energy transfer fluid from said high pressure port of said dual-function compressor and expander to said low pressure port of said dual-function compressor and expander.

21. The method of claim 20 where said recirculating step includes reducing the pressure and temperature of said recirculating energy transfer fluid.

22. The method of claim 21 wherein said reduction of temperature of said recirculating fluid comprises bringing said recirculating fluid into heat exchange contact with said liquid phase of said energy transfer fluid prior to bringing said liquid phase into heat exchange relation with said hot exhaust gasses.

23. The method of claim 17 further comprising the step of pressurizing said liquid phase of said energy transfer fluid before said energy transfer liquid is brought into heat exchange contact with said hot exhaust gases.

* * * * *